(12) United States Patent
Mehedy

(10) Patent No.: US 10,990,659 B2
(45) Date of Patent: Apr. 27, 2021

(54) GRAPHICAL FINGERPRINT AUTHENTICATION MANAGER

(71) Applicant: International Business Machines Corporation, Armonk, NY (US)

(72) Inventor: Lenin Mehedy, Doncaster East (AU)

(73) Assignee: International Business Machines Corporation, Armonk, NY (US)

(*) Notice: Subject to any disclaimer, the term of this patent is extended or adjusted under 35 U.S.C. 154(b) by 136 days.

(21) Appl. No.: 16/002,717

(22) Filed: Jun. 7, 2018

(65) Prior Publication Data

US 2019/0377854 A1 Dec. 12, 2019

(51) Int. Cl.
*G06F 21/32* (2013.01)
*G06K 9/00* (2006.01)
*G06F 3/0488* (2013.01)
*G06F 21/36* (2013.01)

(52) U.S. Cl.
CPC ............ *G06F 21/32* (2013.01); *G06F 3/0488* (2013.01); *G06F 21/36* (2013.01); *G06K 9/0002* (2013.01); *G06K 9/00087* (2013.01); *G06K 9/00926* (2013.01)

(58) Field of Classification Search
CPC ......... G06F 21/32; G06F 3/0488; G06F 21/36
See application file for complete search history.

(56) References Cited

U.S. PATENT DOCUMENTS

| | | | |
|---|---|---|---|
| 6,980,669 B1 | 12/2005 | Uchida | |
| 7,013,030 B2 | 3/2006 | Wong | |
| 8,452,260 B2* | 5/2013 | Matsuoka | H04M 1/72577 455/411 |
| 8,782,775 B2 | 7/2014 | Fadell et al. | |
| 8,788,834 B1* | 7/2014 | Sang | G06F 21/31 713/183 |
| 8,924,893 B2 | 12/2014 | Swink et al. | |
| 9,146,669 B2* | 9/2015 | Kim | H04L 9/3228 |
| 9,235,694 B2* | 1/2016 | Kawakami | H04W 12/06 |
| 9,274,553 B2* | 3/2016 | Erhart | G06F 1/1684 |
| 10,331,873 B1* | 6/2019 | Meyer | G06F 3/016 |

(Continued)

OTHER PUBLICATIONS

Amin, et al., "Biometric and Traditional Mobile Authentication Techniques: Overviews and Open Issues", Bio-inspiring Cyber Security and Cloud Services: Trends and Innovations, © Springer-Verlag Berlin Heidelberg 2014, 25 pages.

(Continued)

*Primary Examiner* — James R Turchen
(74) *Attorney, Agent, or Firm* — Stosch Sabo

(57) ABSTRACT

An authentication system communicatively coupled to an electronic device stores registration information comprising associations between fingerprints and graphics. The authentication system presents a fingerprint-based personal identification pattern (FPIP) on a user interface communicatively coupled to the authentication system. The authentication system records a sequence of fingerprints and compares the sequence of fingerprints to the FPIP using the registration information. The authentication system executes a functionality associated with electronic device in response to matching the sequence of fingerprints to the FPIP according to the registration information.

20 Claims, 8 Drawing Sheets

(56) References Cited

U.S. PATENT DOCUMENTS

| | | | |
|---|---|---|---|
| 2008/0136587 A1* | 6/2008 | Orr | G08C 19/00 |
| | | | 340/5.31 |
| 2008/0226132 A1 | 9/2008 | Gardner | |
| 2010/0009658 A1* | 1/2010 | Wu | H04M 1/673 |
| | | | 455/411 |
| 2015/0358315 A1 | 12/2015 | Cronin | |
| 2016/0350578 A1* | 12/2016 | Chang | G01L 5/0038 |
| 2017/0063851 A1* | 3/2017 | Kim | G06K 9/00087 |
| 2017/0083694 A1* | 3/2017 | Mardikar | G06F 21/32 |
| 2017/0124370 A1* | 5/2017 | He | G06K 9/0002 |
| 2017/0227995 A1* | 8/2017 | Lee | H04L 63/0892 |
| 2018/0068101 A1* | 3/2018 | Kasilya Sudarsan | G06F 21/32 |
| 2018/0189468 A1* | 7/2018 | Shim | G06K 9/00006 |
| 2018/0276356 A1* | 9/2018 | Kim | G06F 21/31 |
| 2018/0285539 A1* | 10/2018 | Agarwal | H04L 63/0861 |
| 2018/0365477 A1* | 12/2018 | Seol | G06F 21/32 |

OTHER PUBLICATIONS

Bartlow, et al., "Evaluating the Reliability of Credential Hardening through Keystroke Dynamics", 17th International Symposium on Software Reliability Engineering (ISSRE'06), 10 pages.

Bhardwaj et al., "Performance Evaluation of Fingerprint Dynamics in Machine Learning and Score Level Fusion Framework.", IETE Technical Review, Published online: Mar. 26, 2018, 7 pages.

Chang, et al., "A graphical-based password keystroke dynamic authentication system for touch screen handheld mobile devices", Journal of Systems and Software 85.5 (2012), pp. 1157-1165.

Go, et al., "Construction of a secure two-factor user authentication system using fingerprint information and password", Journal of Intelligent Manufacturing (2014), 25, pp. 217-230.

Syed, et al., "Leveraging Variations in Event Sequences in Keystroke-dynamics Authentication Systems", 2014 IEEE 15th International Symposium on High-Assurance Systems Engineering, pp. 9-16.

* cited by examiner

| Number | Fingerprint | Graphic |
|---|---|---|
| 1 | FINGERPRINT_1 | CIRCLE |
| 2 | FINGERPRINT_2 | SQUARE |
| ... | ... | ... |
| N | FINGERPRINT_N | IMAGE_N |

FIG. 7A

| Time | Color |
|---|---|
| X < 1 SECOND | BLUE |
| 1.5 < X < 2.5 SECONDS | GREEN |
| 2.6 < X < 3.5 SECONDS | RED |

FIG. 7B

GRAPHICAL FINGERPRINT AUTHENTICATION MANAGER

BACKGROUND

The present disclosure relates to biometric sensors, and, more specifically, to fingerprint sensors for fingerprint-based authentication of electronic devices.

SUMMARY

Aspects of the present disclosure are directed toward a computer-implemented method. The method can comprise storing registration information associated with a user in an authentication system communicatively coupled to at least one fingerprint sensor and an electronic device. The registration information can comprise a plurality of fingerprints of at least one user and a set of graphics. Each fingerprint of the plurality of fingerprints can be associated with at least one graphic of the set of graphics. The method can further comprise presenting, on a user interface communicatively coupled to the authentication system and the electronic device, a Fingerprint-based Personal Identification Pattern (FPIP) comprising a sequence of graphics randomly selected from the set of graphics. The method can further comprise recording, by the authentication system and in response to presenting the FPIP, a sequence of fingerprints based on input to the at least one fingerprint sensor. Respective fingerprints in the sequence of fingerprints can be associated with a respective duration that the respective fingerprint contacted the at least one fingerprint sensor. The method can further comprise executing a function associated with the electronic device in response to matching the sequence of fingerprints to the sequence of graphics based on the registration information.

Further aspects of the present disclosure are directed toward an authentication system comprising a processor and a computer-readable storage medium storing program instructions for fingerprint-based authentication which, when executed by the processor, are configured to cause the processor to perform a method. The method can comprise storing registration information associated with a user in an authentication system communicatively coupled to at least one fingerprint sensor and an electronic device. The registration information can comprise a plurality of fingerprints of at least one user and a set of graphics. Each fingerprint of the plurality of fingerprints can be associated with at least one graphic of the set of graphics. The method can further comprise presenting, on a user interface communicatively coupled to the authentication system and the electronic device, a Fingerprint-based Personal Identification Pattern (FPIP) comprising a sequence of graphics randomly selected from the set of graphics. The method can further comprise recording, by the authentication system and in response to presenting the FPIP, a sequence of fingerprints based on input to the at least one fingerprint sensor. Respective fingerprints in the sequence of fingerprints can be associated with a respective duration that the respective fingerprint contacted the at least one fingerprint sensor. The method can further comprise executing a function associated with the electronic device in response to matching the sequence of fingerprints to the sequence of graphics based on the registration information.

Further aspects of the present disclosure are directed toward a computer program product comprising a computer readable storage medium having program instructions executable by a processor to cause the processor to perform a method. The method can comprise storing registration information associated with a user in an authentication system communicatively coupled to at least one fingerprint sensor and an electronic device. The registration information can comprise a plurality of fingerprints of at least one user and a set of graphics. Each fingerprint of the plurality of fingerprints can be associated with at least one graphic of the set of graphics. The method can further comprise presenting, on a user interface communicatively coupled to the authentication system and the electronic device, a Fingerprint-based Personal Identification Pattern (FPIP) comprising a sequence of graphics randomly selected from the set of graphics. The method can further comprise recording, by the authentication system and in response to presenting the FPIP, a sequence of fingerprints based on input to the at least one fingerprint sensor. Respective fingerprints in the sequence of fingerprints can be associated with a respective duration that the respective fingerprint contacted the at least one fingerprint sensor. The method can further comprise executing a function associated with the electronic device in response to matching the sequence of fingerprints to the sequence of graphics based on the registration information.

The above summary is not intended to illustrate each embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7A illustrates an example registration information table, in accordance with some embodiments of the present disclosure.

FIG. 7B illustrates an example auxiliary registration information table, in accordance with some embodiments of the present disclosure.

Figure 1:
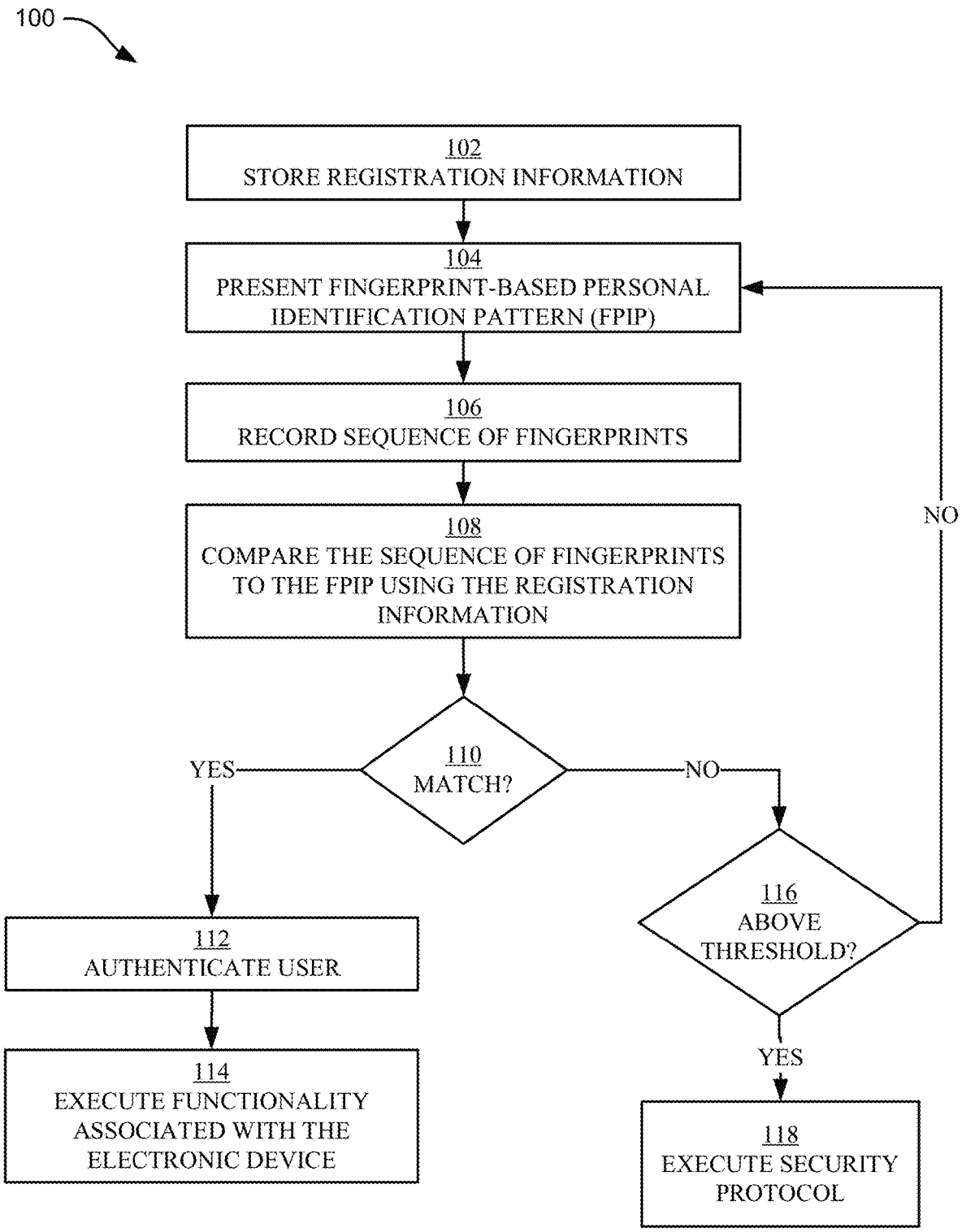
FIG. 1 illustrates a flowchart of an example method for biometrically authenticating a user, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward biometric sensors, and, more specifically, to fingerprint sensors for fingerprint-based authentication of electronic devices. While the present disclosure is not necessarily limited to such applications, various aspects of the present disclosure may be appreciated through a discussion of various examples using this context.

Embodiments of the present disclosure include an authentication system communicatively coupled to an electronic device and a fingerprint sensor. The electronic device can perform a function requiring authentication (e.g., unlocking the electronic device, launching an application on the electronic device, accessing sensitive information using the electronic device, etc.). The authentication system can generate a fingerprint-based personal identification pattern (FPIP) in response to determining the electronic device is performing a function requiring authentication. The FPIP can comprise a predetermined or randomly generated sequence of graphics. The sequence of graphics can comprise colored, shaded, and/or patterned shapes, symbols, images, and/or infographics. The authentication system can record a sequence of fingerprints to the fingerprint sensor. The authentication system can match the sequence of fingerprints to the FPIP using registration information associated with the user and accessible to the authentication system. The registration information can include associations between graphics and fingerprints of the user. The authentication system can permit execution of the function on the electronic device in response to matching the sequence of fingerprints to the FPIP.

Aspects of the present disclosure provide numerous advantages. For example, aspects of the present disclosure improve electronic device security. Typical biometric authentication systems can be compromised because they rely on unchangeable, yet replicable, biometric information. For example, fingerprints, facial characteristics, eye characteristics, and/or voice characteristics can be copied and used to impersonate a user. Furthermore, once the biometric characteristics are copied, a user cannot change those characteristics. Thus, the biometric characteristics are permanently compromised and the user has limited recourse to subsequently restore security. In contrast, aspects of the present disclosure associate graphics to respective fingerprints of the user. Thus, authenticating the user requires multiple fingerprints in a specific sequence as indicated by the sequence of graphics. Thus, an impersonator must both copy multiple fingerprints of the user and identify associations between respective fingerprints and respective graphics. In some embodiments of the present disclosure, security is further improved by associating respective durations with respective fingerprints as indicated by graphics, colors, or other symbols in the FPIP.

As another example advantage, the registration information can be stored in separate tables in separate systems, thereby further improving security by ensuring that if a malicious actor accesses a first table of the registration information, the malicious actor still does not have all the necessary information to bypass the authentication operation.

The aforementioned advantages are example advantages and not all advantages are listed. Furthermore, embodiments of the present disclosure exist that can contain all, some, or none of the aforementioned advantages while remaining within the spirit and scope of the present disclosure.

For the purposes of the present disclosure, a fingerprint sensor can comprises a sensor configured for collecting fingerprint data. A fingerprint sensor can comprise an optical fingerprint sensor, an ultrasonic fingerprint sensor, a capacitance fingerprint sensor, a passive capacitance fingerprint sensor, and/or an active capacitance fingerprint sensor. For the purposes of the present disclosure, a fingerprint sensing area can comprise a region configured for collecting a fingerprint. Fingerprint sensors can collect information related to characterizing a fingerprint such as location, shape, and/or size of arches, loops, whorls, ridges, and/or bifurcations on a fingerprint.

For the purposes of the present disclosure, an electronic device can comprise, but is not limited to, a mobile phone, a tablet, a laptop, a desktop, a computer, a wearable device, or a different electronic device performing a function associated with user authentication. In some embodiments, the electronic device can be in an Internet of Things (IoT) configuration with the fingerprint sensor and the authentication system. For example, the electronic device can be a security system (e.g., a communicatively coupled system of sensors and alarms), an entrance (e.g., door lock, gate, etc.), an appliance (e.g., refrigerator, freezer, dryer, washer, etc.), a vehicle or portion thereof (e.g., vehicle door, vehicle ignition, etc.), or a different piece of equipment.

For the purposes of the present disclosure, an authentication system can comprise a processor and a memory capable of executing instructions in accordance with portions of the present disclosure. In some embodiments, the authentication system provides instructions remotely and/or virtually to a processor for execution.

For the purposes of the present disclosure, discrete references to the fingerprint sensor, the electronic device, and the authentication system need not necessarily refer to separable components, but may instead refer to discrete functions, capabilities, and/or operations integrated within a single system (e.g., a tablet). Thus, in some embodiments, two or more of the authentication system, the electronic device, and the fingerprint sensor can be integrated within one another (e.g., a smartphone) while in other embodiments two or more of the authentication system, the electronic device, and the fingerprint sensor can be physically separated and communicatively coupled to one another (e.g., a fingerprint sensor connected by a universal serial bus (USB) connection to a desktop computer).

For the purposes of the present disclosure, graphics can comprise shapes (e.g., a circle, a semi-circle, an ellipse, an annulus, a square, a rectangle, a rhombus, an equilateral triangle, an isosceles triangle, a right triangle, a pentagon, a hexagon, an octagon, etc.), symbols (e.g., a currency symbol, an ampersand, an asterisk, a percent sign, mathematical symbols, etc.), letters (e.g., English letters, Greek letters/ symbols, Coptic letters/symbols, letter-like symbols, etc.), numbers (e.g., digits, numerals, decimals, integers, etc.), patterns, images (e.g., a photograph, a cartoon, a pictograph, an emoticon, an emoji, etc.), and/or other infographics. In some embodiments, graphics include one or more colors.

For the purposes of the present disclosure, colors can comprise combinations of visually perceptible combinations in the Red, Green, Blue (RGB) color space. In some embodiments, colors can be represented using three numbers, each ranging from 0 to 255 and corresponding to red, green, or blue. Colors can include shades, tones, gradients, patterns, and other variations associated with the RGB color space. In some embodiments, the term colors refers to gradients of gray ranging from white to black.

Referring now to FIG. 1, illustrated is a flowchart of an example method for biometrically authenticating a user in accordance with some embodiments of the present disclosure. The method 100 can be implemented by an authentication system (e.g., authentication system 800 of FIG. 8), a processor reading and executing instructions, or a different hardware configuration. For clarity, the method 100 will be described as being performed by an authentication system, however, the method 100 can likewise be executed by alternative configurations of hardware.

In operation 102, the authentication system can store registration information in the authentication system and/or an electronic device communicatively coupled to the authentication system. Registration information can include a plurality of fingerprints (e.g., two or more) of a respective user, a set of numeric digits, and/or a set of graphics. Registration information can comprise associations between numbers (e.g., digits) and fingerprints of a user, associations between numbers and graphics, and/or associations between numbers and colors. In some embodiments, graphics and/or colors can be associated with times (e.g., durations) indicating a range of time each fingerprint should contact the fingerprint sensor (and/or a range of time between respective fingerprints in a sequence of fingerprints). Thus, respective digits of the set of numeric digits can be associated with a respective fingerprint, a respective graphic, a respective color, and/or a respective time. Associations can be stored in a single table, multiple interrelated tables, or using a different data organization technique. Registration information can include a user identifier (e.g., a phone number, a name, an email address, a unique identification number (UIN), etc.). The associations can be defined by user input to an interface communicatively coupled to the authentication system. In some embodiments, user input is collected as part of a registration process for the electronic device and/or the authentication system.

In operation 104, the authentication system can present a fingerprint-based personal identification pattern (FPIP) to a user interface communicatively coupled to the authentication system (e.g., a display of a mobile phone). The FPIP can comprise a sequence of graphics. In embodiments where the graphics are a similar graphic (e.g., circles), the graphics can be associated with colors in order to differentiate the graphics. In embodiments where the graphics are dissimilar (e.g., various shapes), the graphics can optionally be colored to indicate additional information (e.g., a duration of each fingerprint associated with each graphic, a duration between respective fingerprints associated with respective graphics, or other information).

In some embodiments, a FPIP can comprise between 1 and 10 graphics in the sequence of graphics, inclusive. In some embodiments, the FPIP can comprise between 3 and 5 graphics in the sequence of graphics, inclusive. In some embodiments, the FPIP can comprise 4 graphics in the sequence of graphics.

In some embodiments, operation 104 comprises generating the FPIP using, for example, a random number generator (RNG) and converting respective digits generated by the RNG to respective graphics and/or colors according to the registration information to generate the FPIP. Although a RNG was previously discussed, a pseudorandom number generator or a cryptographically secure pseudorandom number generator (CSPNG) can likewise be used. In some embodiments, the numbers are not generated randomly at all, but may instead follow a series of combinations to accelerate presentations of the FPIP by not requiring number generation. In some embodiments, a same sequence of graphics is repeatedly used for the FPIP (e.g., a sequence of graphics chosen as a password based on user input in operation 102).

In operation 106, the authentication system can record a sequence of fingerprints to a fingerprint sensor communicatively coupled to the authentication system (e.g., a touch screen of a mobile phone). The sequence of fingerprints can be received based on user input to the authentication system. Each fingerprint can be associated with a respective duration comprising an amount of time the fingerprint contacted the fingerprint sensor. The sequence of fingerprints can be recorded in a memory (e.g., a short term memory, a long term memory, etc.) communicatively coupled to the authentication system.

In some embodiments, respective fingerprints in the sequence of fingerprints can be recorded based on input to two or more fingerprint sensors communicatively coupled to the authentication system. In such embodiments, fingerprints recorded on a first fingerprint sensor can be associated with a first user and fingerprints recorded on a second fingerprint sensor can be associated with the first user or a second user. Thus, two or more fingerprint sensors can be used to collect fingerprints from one or more users in order to authenticate a user.

Embodiments associated with fingerprints from multiple users can be useful in situations requiring multi-party authentication and/or approval. For example, a minor (e.g., a child) may need parental approval to access a computer or mobile phone. In some embodiments, the sequence of fingerprints can be recorded on one or more sensors in order to collect fingerprints from both the minor and the parent in order to execute a functionality associated with the electronic device.

Embodiments associated with multiple fingerprint sensors can be used with a single user to improve user efficiency. For example, a keyboard with multiple embedded fingerprint sensors can allow a user to input fingerprints more efficiently by inputting separate fingerprints to separate fingerprint sensors.

In embodiments including multiple fingerprint sensors and/or fingerprints associated with multiple users, the registration information can further comprise details relating to fingerprint sensors (e.g., identifiers, types, classifications, etc.) and/or users (e.g., identifiers, roles, fingerprints, etc.).

In operation 108, the authentication system can compare the sequence of fingerprints to the FPIP using the registration information stored in operation 102. In some embodiments, operation 108 comprises converting the FPIP to a first number using the registration information and converting the sequence of fingerprints to a second number using the registration information and comparing the first number to the second number. In such embodiments, a match can comprise the first number being identical to the second number. In some embodiments, the sequence of fingerprints is converted to a sequence of graphics according to the registration information, and the sequence of graphics is compared to the FPIP for similarities in shape and/or color. Operation 108 is discussed in more detail hereinafter with respect to FIG. 2.

In operation 110, the authentication system determines whether the sequence of fingerprints matches the FPIP based on the information generated in operation 108. If the sequence of fingerprints matches the FPIP, the authentication system authenticates the user in operation 112. Authenticating the user can comprise recording the match determination and/or presenting a notification that the user is authenticated. In operation 114, the authentication system can execute a functionality associated with the electronic device. For example, the electronic device can unlock a portion of the electronic device, complete a transaction, open an application, display private data, access sensitive information, send a message, activate an actuator (e.g., a door lock), and so on.

If the authentication system determines that the sequence of fingerprints does not match the FPIP, the authentication system can determine if a number of failed attempts is above a threshold (e.g., a fourth failed attempt where the threshold comprises three failed attempts) in operation 116. If the authentication system determines the number of failed attempts is equal to or below the threshold, the authentication system can return to operation 104 and present a different FPIP or re-present the same FPIP. If the number of failed authentication attempts is above the threshold, then the authentication system can proceed to operation 118 and implement a security protocol. A security protocol can be, for example, locking the electronic device for a predetermined time, notifying a user associated with the electronic device of the suspicious activity via an email, a text message, a voicemail, or a different notification mechanism, notifying a security authority of the suspicious activity, requiring two-factor authentication, or a different security protocol.

FIG. 1 is intended to represent the major operations of an example method 100 for biometrically authenticating a user according to embodiments of the present disclosure. In some embodiments, however, individual operations can have greater or lesser complexity than shown in FIG. 1, and operations other than, or in addition to those shown in FIG. 1 can be present. Furthermore, in some embodiments, various operations illustrated in FIG. 1 can have greater, lesser, or different functionality than shown in FIG. 1.

Figure 2:
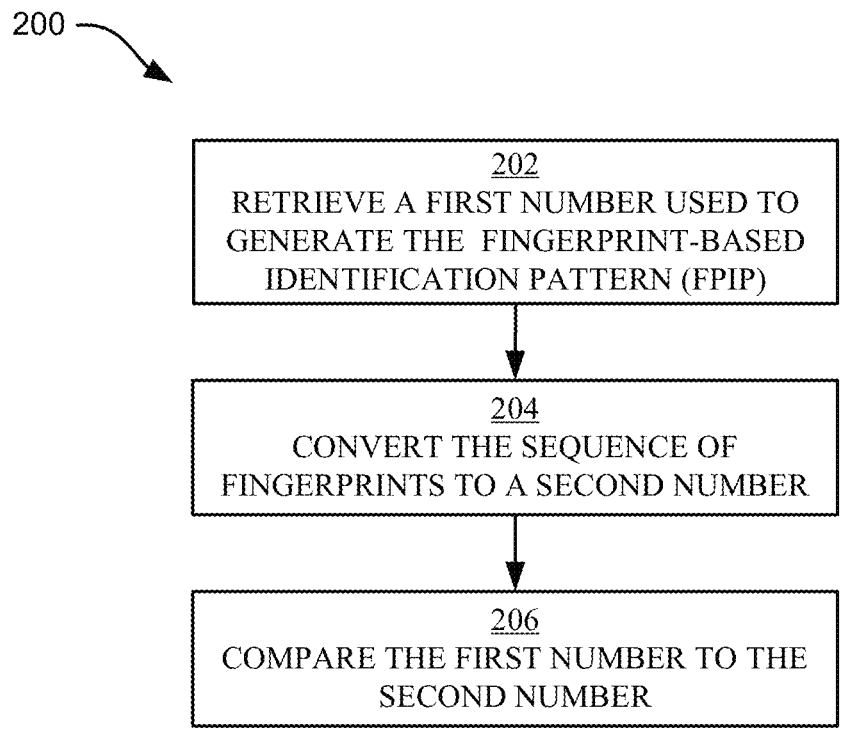
FIG. 2 illustrates a flowchart of an example method for determining if an input sequence of fingerprints matches a generated fingerprint-based personal identification pattern (FPIP), in accordance with some embodiments of the present disclosure.

Referring now to FIG. 2, illustrated is a flowchart of an example method for comparing a sequence of fingerprints to a FPIP, in accordance with some embodiments of the present disclosure. In some embodiments, the method 200 is a sub-method of operation 108 of FIG. 1. The method 200 can be implemented by an authentication system (e.g., authentication system 800 of FIG. 8), a processor reading and executing instructions, or a different hardware configuration. For clarity, the method 200 will be described as being performed by an authentication system, however, the method 200 can likewise be executed by alternative configurations of hardware.

In operation 202, the authentication system can retrieve a first number used to generate the FPIP (e.g., the number generated in operation 104 of FIG. 1 and used to generate the FPIP). In some embodiments, the authentication system may not have stored the first number used to generate the FPIP and can instead derive the first number based on the FPIP and the registration information (e.g., the registration information stored in operation 102 of FIG. 1). In such embodiments, the authentication system can convert the FPIP to the first number by replacing each graphic with the associated digit per the registration information. In embodiments including durations, the authentication system can associate respective ranges of time to respective digits in the first number. Respective ranges of time can comprise explicit ranges of time (e.g., 1.5-2.5 seconds) or a time associated with a tolerance (e.g., 2.0±0.5 seconds).

In operation 204, the authentication system can convert the sequence of fingerprints (e.g., the sequence of fingerprints recorded in operation 106 of FIG. 1) to a second number. The authentication system can convert the sequence of fingerprints to the second number based on the registration information. For example, the authentication system can replace each fingerprint with its associated digit according to the registration information. In embodiments including durations, the authentication system can associate respective durations to respective digits associated with respective fingerprints in the sequence of fingerprints based on the registration information.

In operation 206, the authentication system can compare the first number to the second number. In embodiments including durations, the authentication system can compare respective ranges of time associated with respective digits in the first number to respective durations associated with corresponding digits in the second number. The respective ranges of time associated with respective digits in the first number can provide a reasonable range of durations for a user to satisfy a target duration. For example, a respective fingerprint can be associated with a 1.15 second duration and the range of times can be 0.5 seconds to 1.5 seconds.

FIG. 2 is intended to represent the major operations of an example method 200 for comparing a recorded sequence of fingerprints to a FPIP according to embodiments of the present disclosure. In some embodiments, however, individual operations can have greater or lesser complexity than shown in FIG. 2, and operations other than, or in addition to those shown in FIG. 2 can be present. Furthermore, in some embodiments, various operations illustrated in FIG. 2 can have greater, lesser, or different functionality than shown in FIG. 2.

Figure 3:
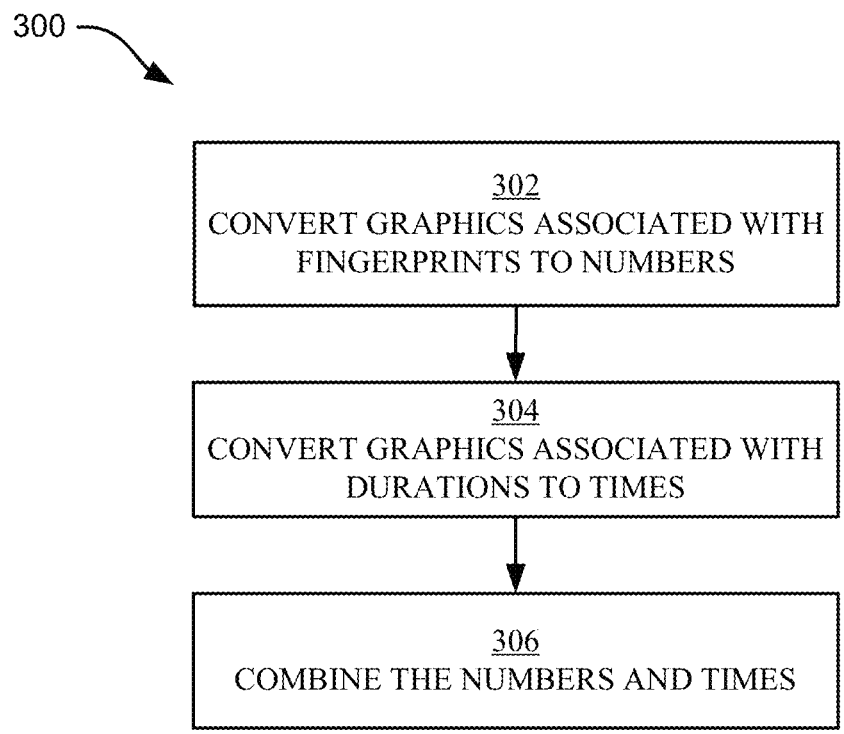
FIG. 3 illustrates a flowchart of an example method for converting a sequence of graphics to a number, in accordance with some embodiments of the present disclosure.

Referring now to FIG. 3, illustrated is a flowchart of an example method for converting a sequence of graphics to a number in accordance with some embodiments of the present disclosure. In some embodiments, the method 300 is an alternative to operation 202 of FIG. 2 in situations where the original number associated with the FPIP is not accessible. The method 300 can be implemented by an authentication system (e.g., authentication system 800 of FIG. 8), a processor reading and executing instructions, or a different hardware configuration. For clarity, the method 300 will be described as being performed by an authentication system, however, the method 300 can likewise be executed by alternative configurations of hardware.

In operation 302, the authentication system can convert graphics associated with fingerprints to numbers according to the registration information (e.g., the registration information stored in operation 102 of FIG. 1). In some embodiments, the authentication system performs a database lookup on a database associated with the registration information.

In operation 304, the authentication system can convert graphics associated with durations to times according to the registration information (e.g., the registration information stored in operation 102 of FIG. 1). In some embodiments, the graphics are of a similar family to the graphics in operation 302 (e.g., shapes), while in other embodiments, the graphics converted in operation 304 comprise a different class of graphics (e.g., colors) compared to the graphics converted in operation 302 (e.g., shapes).

In operation 306, the authentication system can combine the numbers from operation 302 with the times from operation 304. In some embodiments, the numbers are combined as separate attributes such as, but not limited to a vector storing the number in a first position and the time (e.g., the range of durations) in the second position. In some embodiments, the numbers are combined into a new number. For example, if a graphic is associated with the number 3 in operation 302, and a graphic is associated with the range of times 0.5 to 1.5 in operation 304, operation 306 can present numbers in the range 30.5-31.5. In such embodiments, a fingerprint in a sequence of fingerprints corresponding to the number 3 and lasting for a duration of 1.2 seconds can be converted to 31.2, and the authentication system can confirm that 31.2 is within the range 30.5-31.5 and match that portion of the FPIP. In such embodiments, the first number can comprise a vector with each element comprising a range of allowable numbers and the second number can comprise a vector with each element comprising a single number.

FIG. 3 is intended to represent the major operations of an example method for converting a FPIP to a number according to embodiments of the present disclosure. In some embodiments, however, individual operations can have greater or lesser complexity than shown in FIG. 3, and operations other than, or in addition to those shown in FIG. 3 can be present. Furthermore, in some embodiments, various operations illustrated in FIG. 3 can have greater, lesser, or different functionality than shown in FIG. 3.

Figure 4A:
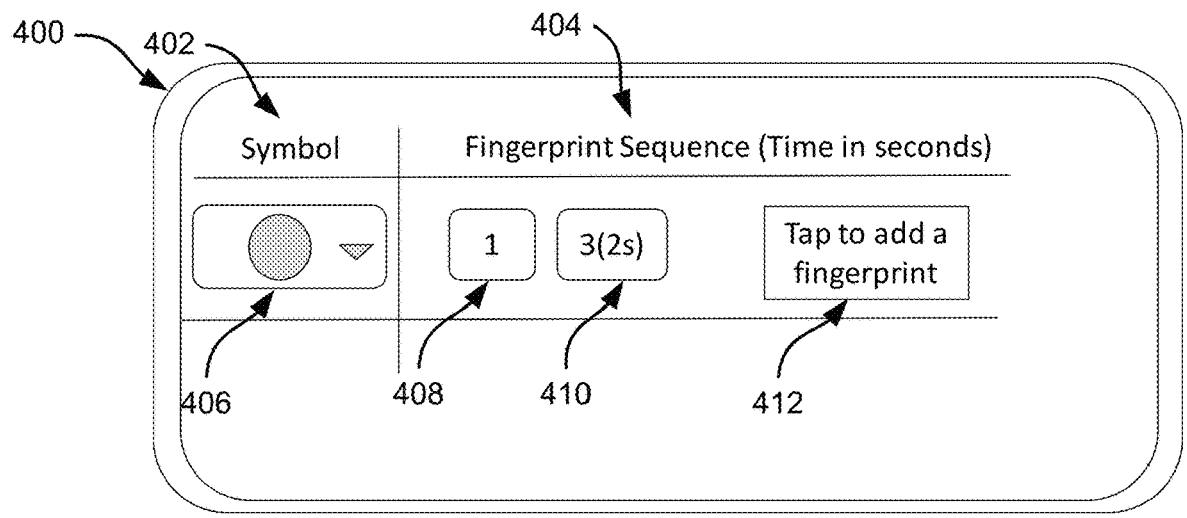
FIG. 4A illustrates an example registration screen, in accordance with some embodiments of the present disclosure.

FIG. 4A illustrates an example registration screen 400 in accordance with some embodiments of the present disclosure. Registration screen 400 can include a symbol column 402 and a sequence column 404. Symbol column 402 can include a dropdown menu with different graphics 406. Although a circular graphic is shown, alternative classes and types of graphics are possible, such as those discussed above. Sequence column 404 can include a sequence indicator 408 (e.g., the "1" can indicate a first part of the sequence), a fingerprint/duration indicator 410, and an input section 412. Fingerprint/duration indicator 410 can indicate a finger by number (e.g., the "3" can indicate a middle finger on the user's right hand, however, any number of counting orders are possible such that the "3" could likewise indicate other fingers in other embodiments) and a duration of time (e.g., the "2 s" can indicate two seconds, though the time can automatically be associated with a tolerance such that in reality any time between, for example, 1.5 seconds and 2.4 seconds would be approximated as two seconds). Although fingerprint/duration indicator 410 includes both a fingerprint and a duration, embodiments exist containing only a sequence of fingerprints irrespective of associated times. Likewise, embodiments exist containing only times irrespective of which fingerprint is used. Input section 412 can activate a fingerprint sensor configured to characterize a fingerprint corresponding to the fingerprint/duration indicator 410 as discussed in FIG. 4B.

Figure 4B:
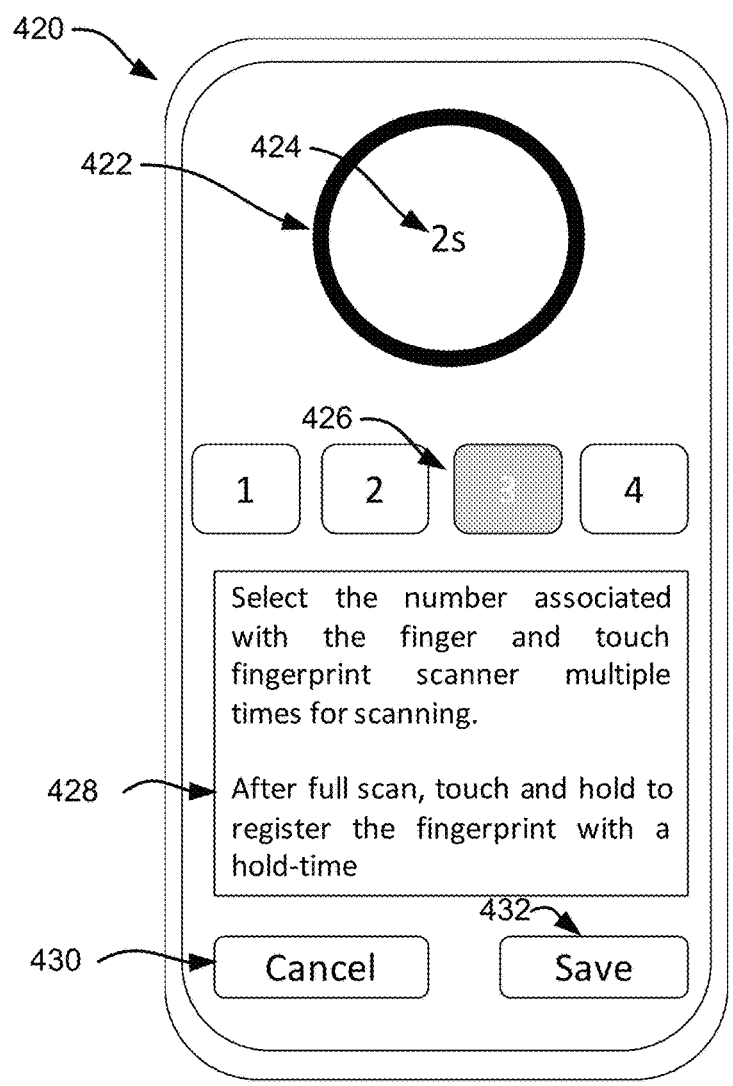
FIG. 4B illustrates another example registration screen, in accordance with some embodiments of the present disclosure.

Referring now to FIG. 4B, illustrated is a second example registration screen 420, in accordance with some embodiments of the present disclosure. In some embodiments, the second example registration screen 420 is presented on an electronic device in response to a user selecting input section 412 of FIG. 4A.

The second example registration screen 420 includes a fingerprint sensing area 422 configured for recording a fingerprint in the fingerprint sensing area 422 using a fingerprint sensor, a time indicator 424 for indicating the amount of time a user should leave his/her finger in the fingerprint sensing area 422, a fingerprint indicator 426 indicating which fingerprint to use, instructions 428 providing operating instructions to the user, a cancel button 430 for discarding a fingerprint input and/or returning to the first example registration screen 400 of FIG. 4A, and a save button 432 for storing the recorded fingerprint from the fingerprint sensing area 422 for the time indicator 424 as registration information in the electronic device.

As will be appreciated by one skilled in the art, FIGS. 4A and 4B are shown for illustration purposes. Registration screens having characteristics, features, functionalities, and/or appearances similar or dissimilar to the characteristics, features, functionalities, and/or appearances illustrated in FIGS. 4A-4B exist that remain within the spirit and scope of the present disclosure.

Figure 5A:
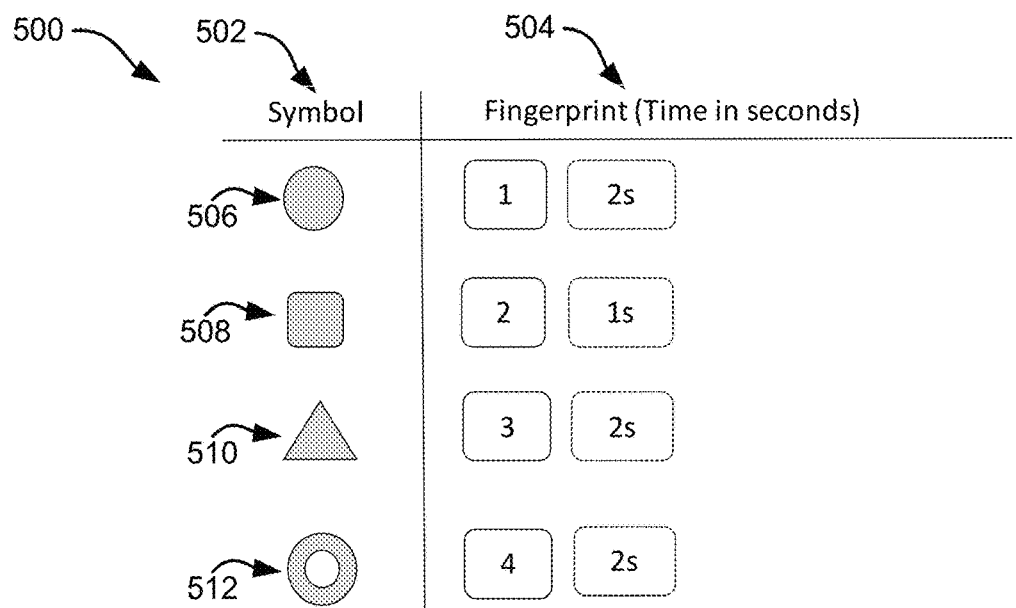
FIG. 5A illustrates first example registration information, in accordance with some embodiments of the present disclosure.

FIG. 5A illustrates a first example registration information 500, in accordance with some embodiments of the present disclosure. The first example registration information 500 can include symbols 502 associated with fingerprints and/or times 504. For example, a first symbol 506 comprising a circle can be associated with a first fingerprint (e.g., a thumb on the right hand of the user) and a first time comprising two seconds. A second symbol 508 comprising a square can be associated with a second fingerprint (e.g., an index finger on the right hand of the user) and a second time comprising one second. A third symbol 510 comprising a triangle can be associated with a third fingerprint (e.g., a middle finger on the right hand of the user) and a third time comprising two seconds. A fourth symbol 512 can be associated with a fourth fingerprint (e.g., a ring finger on a right hand of the user) and a fourth time comprising two seconds.

As indicated by the dashed lines, the times (e.g., 2 s, 1 s, 2 s, 2 s) are optional, and embodiments exist that only associate graphics with FPIP's. Although four symbols are shown in FIG. 5A, more or fewer symbols, associated with more or fewer fingerprints and more or fewer durations, are possible in other embodiments.

Figure 5B:
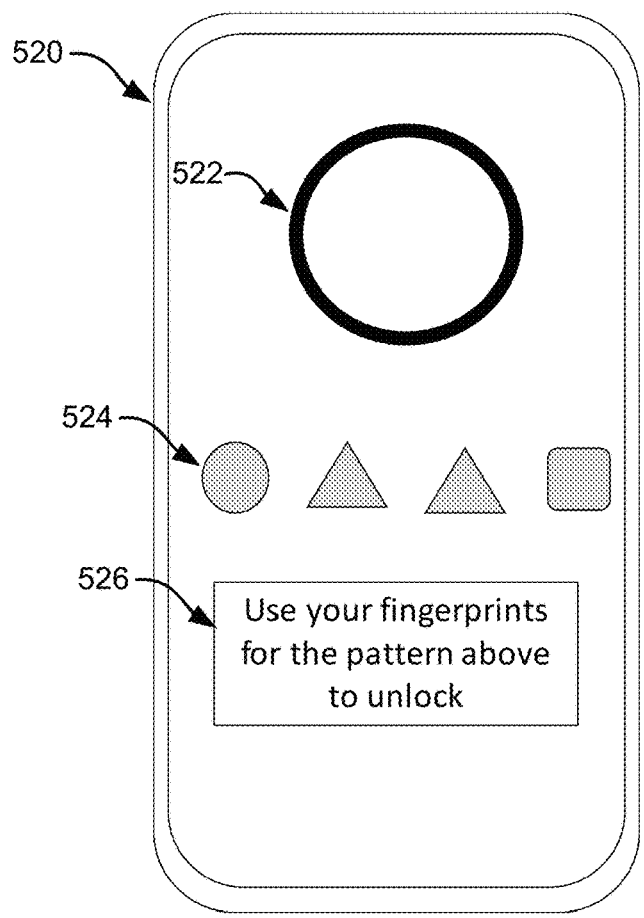
FIG. 5B illustrates a first example authentication screen, in accordance with some embodiments of the present disclosure.

FIG. 5B illustrates a first example authentication screen 520, according to some embodiments of the present disclosure. In some embodiments, the first example authentication screen 520 is generated based on the first example registration information 500 illustrated in FIG. 5A. The first example authentication screen 520 can include a fingerprint sensing area 522, a sequence of graphics 524 comprising the FPIP, and instructions 526. A user can input fingerprints to fingerprint sensing area 522 according to the pattern of graphics 524 and the user's knowledge of associated fingerprints (and, in some embodiments, times) as stored in the first example registration information 500 of FIG. 5A. In the example illustrated in FIG. 5B, a user can be authenticated by inputting the first fingerprint, such as a thumb of the right hand of the user (optionally for approximately 2 seconds), followed by a third fingerprint, such as a middle finger of the right hand of the user (optionally for approximately 2 seconds), followed by the third fingerprint, such as the middle finger of the right hand of the user (optionally for approximately 2 seconds), followed by a second fingerprint, such as the index finger of the right hand of the user (optionally for approximately 1 second).

Figure 6A:
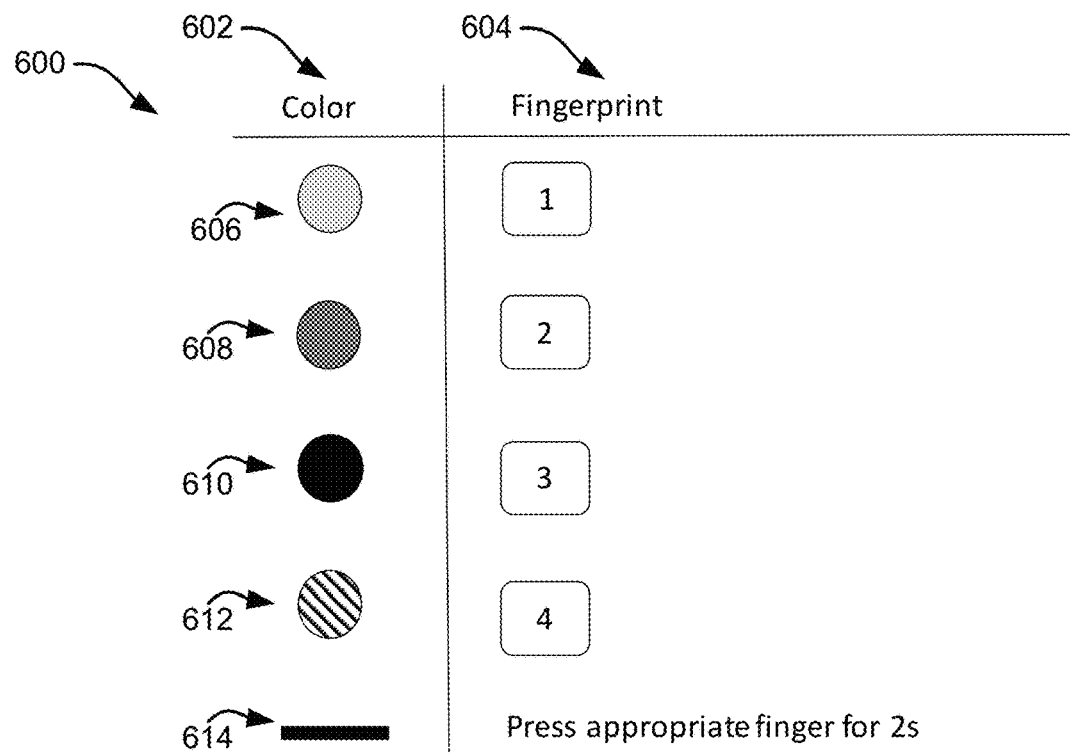
FIG. 6A illustrates second example registration information, in accordance with some embodiments of the present disclosure.

FIG. 6A illustrates a second example registration information 600, according to some embodiments of the present disclosure. The second example registration information 600 can comprise colors 602 and fingerprints 604. For example, a first color 606 can be associated with a first fingerprint (e.g., a thumb on the right hand of the user), a second color 608 can be associated with a second fingerprint (e.g., an index finger on the right hand of the user), a third color 610 can be associated with a third fingerprint (e.g., a middle finger on the right hand of the user), and a fourth color 612 (e.g., a combination of colors displayed in a pattern) can be associated with a fourth fingerprint (e.g., a ring finger of the right hand of the user). Furthermore, a time graphic 614 can be associated with a time (e.g., two seconds) and not associated with any fingerprint. The time graphic 614 can be integrated into a FPIP to indicate that an adjacent (e.g., a preceding fingerprint and/or a subsequent fingerprint) should be associated with a duration associated with the time graphic 614.

Figure 6B:
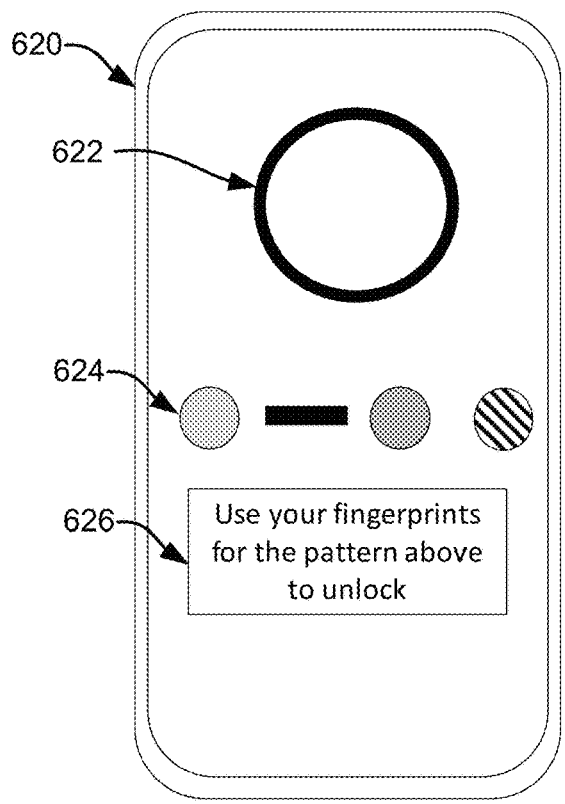
FIG. 6B illustrates a second example authentication screen, in accordance with some embodiments of the present disclosure.

FIG. 6B illustrates a second example authentication screen 620, according to some embodiments of the present disclosure. The second example authentication screen 620 can comprise a fingerprint sensing area 622, a second example FPIP 624, and instructions 626. In some embodiments, the second example FPIP 624 is generated according to the second example registration information 600 of FIG. 6A. In some embodiments, the second example authentication screen 620 can authenticate a user in response to receiving appropriate fingerprints for appropriate durations in the fingerprint sensing area 622 according to the second example FPIP 624. In this example, the appropriate input comprises the first fingerprint (e.g., a thumb on the right hand of the user) for two seconds, the second fingerprint (e.g., the index finger on the right hand of the user) for a default time (e.g., under one second), and the fourth fingerprint (e.g., the ring finger of the right hand of the user) for the default time.

FIG. 7A illustrates a first example registration information table 700, according to some embodiments of the present disclosure. The first example registration information table 700 can include numbers 702 (also referred to as digits) respectively associated with fingerprints 704 and graphics 706. Numbers 702 can comprise numeric digits, numeric identifiers, textual identifiers, or alphanumeric identifiers useful for uniquely identifying each record in the first example registration information table 700. Fingerprints 704 can comprise recorded fingerprint patterns collected from a fingerprint sensor (e.g., fingerprint sensing area 522 of FIG. 5B or 622 of FIG. 6B). Respective fingerprints 704 can comprise image files (e.g., jpeg, TIF, or other image files) or reproducible functions (e.g., pattern-characterizing algorithms, pattern-matching algorithms, etc.) capable of uniquely characterizing a respective fingerprint 704. Graphics 706 can comprise any of the graphics previously discussed including, but not limited to, shapes, symbols, images, and/or other infographics.

FIG. 7B illustrates a second example registration information table 720, in accordance with some embodiments of the present disclosure. The second example registration information table 720 can include times 722 associated with colors 724. Times 722 can comprise respective ranges of time and colors 724 can comprise colors definable according to the RGB color space, a grayscale, and/or a pattern. In some embodiments, the second example registration information table 720 is used in tandem with the first registration information table 700 to generate FPIPs having the additional security provided by respective durations associated with respective fingerprints in an FPIP. For example, a FPIP utilizing both the first example registration information table 700 and the second example registration information table 720 can generate a FPIP comprising a sequence of graphics where each graphic is associated with a respective color. In such an example, a user can authenticate by inputting correct fingerprints for correct durations in a correct sequence.

Advantageously, separated registration information tables can improve security by distributing sensitive information so that a malicious actor that accesses a first registration table may still not have sufficient information to successfully impersonate a user during an authentication process.

As will be appreciated by one skilled in the art, FIGS. 7A and 7B are shown for exemplary purposes and alternative registration information tables can exist, if they exist at all, having different formats and configurations and containing more information, less information, or different information than the information illustrated in FIGS. 7A-7B while remaining within the spirit and scope of the present disclosure.

As one non-limiting example, a third example registration information table could comprise the first example registration information table 700 combined with the second example registration information table 720 such that each combination of graphic 706 and color 724 is identified by a unique number 702.

Figure 8:
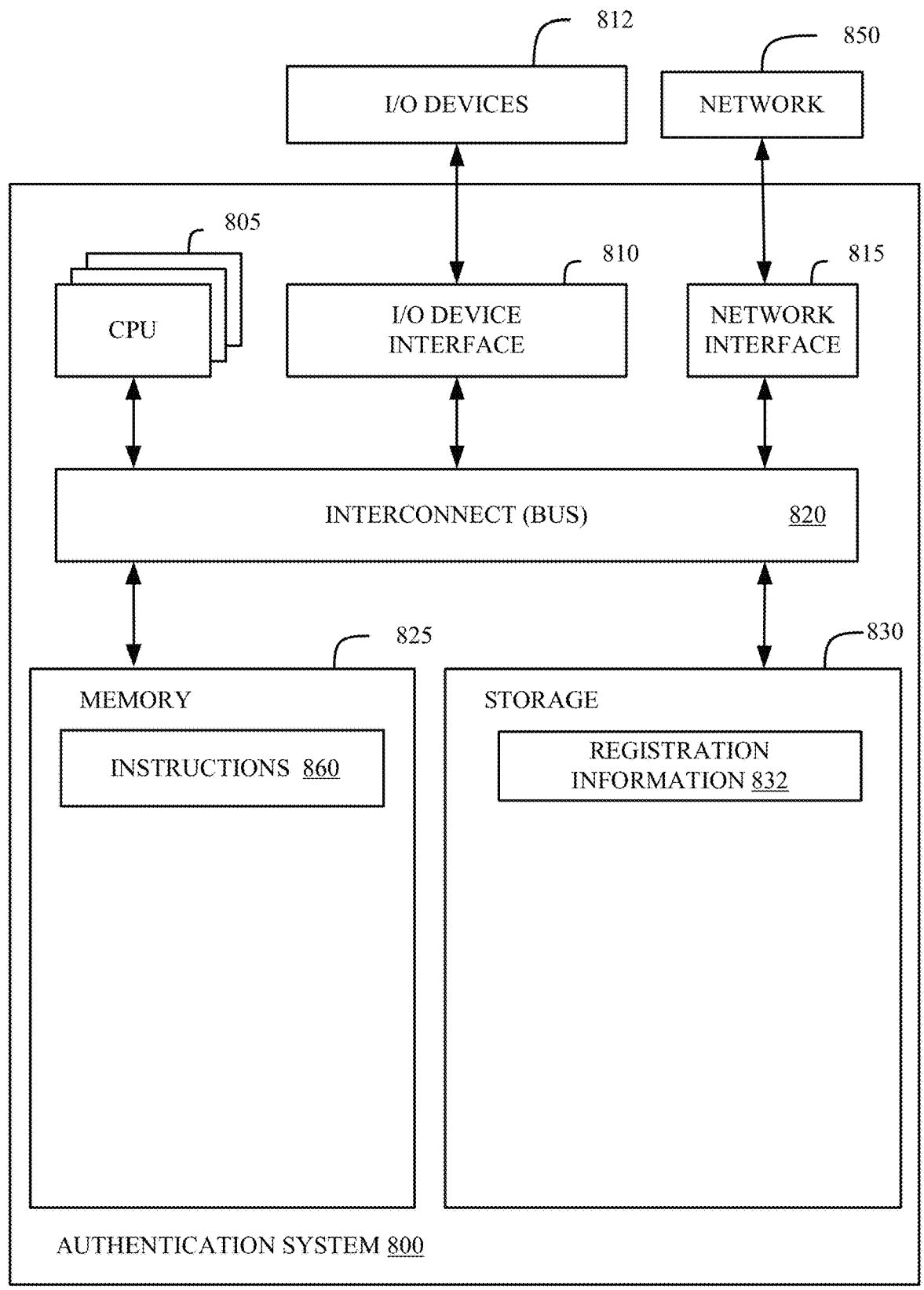
FIG. 8 illustrates a block diagram of an example authentication system in accordance with some embodiments of the present disclosure.

FIG. 8 illustrates a block diagram of an authentication system 800 in accordance with some embodiments of the present disclosure. In various embodiments, authentication system 800 performs any of the methods described in FIGS. 1-3. In some embodiments, authentication system 800 provides instructions for one or more of the methods described in FIGS. 1-3 to a client machine (e.g., an electronic device) such that the client machine executes the method, or a portion of the method, based on the instructions provided by the authentication system 800.

The authentication system 800 includes a memory 825, storage 830, an interconnect (e.g., BUS) 820, one or more CPUs 805 (also referred to as processors 805 herein), an I/O device interface 810, I/O devices 812, and a network interface 815.

Each CPU 805 retrieves and executes programming instructions stored in the memory 825 or storage 830. The interconnect 820 is used to move data, such as programming instructions, between the CPUs 805, I/O device interface 810, storage 830, network interface 815, and memory 825. The interconnect 820 can be implemented using one or more busses. The CPUs 805 can be a single CPU, multiple CPUs, or a single CPU having multiple processing cores in various embodiments. In some embodiments, a CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random access memory (e.g., static random access memory (SRAM), dynamic random access memory (DRAM), or Flash). The storage 830 is generally included to be representative of a non-volatile memory, such as a hard disk drive, solid state device (SSD), removable memory cards, optical storage, or flash memory devices. In an alternative embodiment, the storage 830 can be replaced by storage area-network (SAN) devices, the cloud, or other devices connected to the authentication system 800 via the I/O devices interface 810 or a network 850 via the network interface 815.

In some embodiments, the memory 825 stores instructions 860 and the storage 830 stores registration information 832. However, in various embodiments, the instructions 860 and the registration information 832 are stored partially in memory 825 and partially in storage 830, or they are stored entirely in memory 825 or entirely in storage 830, or they are accessed over a network 850 via the network interface 815.

The registration information 832 can comprise associations between two or more of numbers (e.g., identifiers), fingerprints, graphics, durations, and/or colors. Registration information 832 can be created based on user input (e.g., as discussed in operation 102 of FIG. 1) and used to generate respective FPIPs and compare a recorded sequence of fingerprints to a generated FPIP to determine whether or not to authenticate a user.

The instructions 860 are processor executable instructions for executing any portion of, any combination of, or all of the methods previously discussed in FIGS. 1-3. In some embodiments, the instructions 860 store processor executable instructions for generating any of the example screens discussed in FIGS. 4A-4B, 5A-5B, and/or 6A-6B. In some embodiments, the instructions 860 store processor executable instructions for generating, populating, and/or utilizing a table such as the tables illustrated in FIGS. 7A-7B.

In various embodiments, the I/O devices 812 include an interface capable of presenting information and receiving input. For example, I/O devices 812 can present information to a user (e.g., a FPIP) interacting with authentication system 800 and receive input from the user (e.g., a sequence of fingerprints with respective durations). In some embodiments, I/O devices 812 further comprise at least one fingerprint sensor.

Authentication system 800 is connected to the network 850 via the network interface 815. Network 850 can comprise a physical, wireless, cellular, or different network.

FIG. 8 is intended to represent the major components of an example authentication system 800 according to embodiments of the present disclosure. In some embodiments, however, individual components can have greater or lesser complexity than shown in FIG. 8, and components other than, or in addition to those shown in FIG. 8 can be present. Furthermore, in some embodiments, various components illustrated in FIG. 8 can have greater, lesser, or different functionality than shown in FIG. 8.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 860 of FIG. 8 and/or any software configured to perform any subset of the methods described with respect to FIGS. 1-3) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

What is claimed is:

1. A computer-implemented method comprising:
   storing registration information associated with a user in an authentication system communicatively coupled to at least one fingerprint sensor and an electronic device, wherein the registration information comprises a plurality of fingerprints of the user and a set of graphics, wherein each graphic of the set of graphics is associated with a respective fingerprint of the plurality of fingerprints and a respective duration of a plurality of durations;
   presenting, on a user interface communicatively coupled to the authentication system and the electronic device, a Fingerprint-based Personal Identification Pattern (FPIP) comprising a sequence of graphics selected from the set of graphics;
   recording, by the authentication system and in response to presenting the FPIP, a sequence of fingerprints based on input to the at least one fingerprint sensor, wherein respective fingerprints in the sequence of fingerprints are associated with respective durations of the plurality of durations that the respective fingerprint contacted the at least one fingerprint sensor; and
   executing a function associated with the electronic device in response to matching, based on the registration information, the sequence of fingerprints to the sequence of graphics and matching the respective durations of the sequence of fingerprints to corresponding durations of the plurality of durations associated with graphics in the sequence of graphics.

2. The method according to claim 1, wherein the registration information further comprises each fingerprint of the plurality of fingerprints respectively associated with at least one digit of a set of numeric digits, wherein the registration information further comprises each graphic of the set of graphics respectively associated with at least one digit of the set of numeric digits.

3. The method according to claim 2, wherein the method further comprises:
   matching the sequence of fingerprints to the FPIP in response to recording the sequence of fingerprints, wherein matching the sequence of fingerprints comprises:
      converting the sequence of graphics to a first number by replacing each graphic with an associated digit according to the registration information;
      converting the sequence of fingerprints to a second number by replacing each fingerprint with an associated digit according to the registration information; and
      comparing the first number to the second number, wherein a match comprises the first number being identical to the second number.

4. The method according to claim 2, wherein the set of graphics in the registration information further comprises a first subset of graphics associated with respective digits and a second subset of graphics associated with respective ranges of time, wherein a first graphic in the sequence of graphics is from the first subset of graphics, wherein a second graphic in the sequence of graphics is from the second subset of graphics;

wherein the method further comprises:
matching the sequence of fingerprints to the sequence of graphics in response to recording the sequence of fingerprints, wherein matching the sequence of fingerprints comprises:
converting the sequence of graphics to a first number by:
replacing each graphic from the first subset of graphics in the sequence of graphics with an associated digit according to the registration information;
replacing each graphic from the second subset of graphics in the sequence of graphics with an associated range of time according to the registration information;
associating respective ranges of time with respective digits; converting the sequence of fingerprints to a second number by:
replacing each fingerprint in the sequence of fingerprints with an associated digit according to the registration information;
associating respective durations to respective digits corresponding to respective fingerprints;
comparing the first number to the second number, wherein a match comprises the first number being identical to the second number and each respective duration being within each respective range of time for corresponding digits in the first number and the second number.

5. The method according to claim 2, wherein the registration information further comprises respective colors associated with respective ranges of time, wherein the sequence of graphics includes a respective color associated with each graphic of the sequence of graphics;
wherein the method further comprises:
matching the sequence of fingerprints to the sequence of graphics in response to recording the sequence of fingerprints, wherein matching the sequence of fingerprints comprises:
converting the sequence of graphics to a first number by:
replacing each graphic in the sequence of graphics with an associated digit according to the registration information;
associating a respective range of time to each respective graphic according to a respective color of the respective graphic and the registration information; converting the sequence of fingerprints to a second number by:
replacing each fingerprint with an associated digit according to the registration information;
associating respective durations to respective digits associated with respective fingerprints;
comparing the first number with associated ranges of time to the second number with associated durations, wherein a match comprises the first number identical to the second number and respective durations within respective ranges of time for corresponding digits in the first number and the second number.

6. The method according to claim 2, wherein the sequence of graphics comprises randomly selected graphics from the set of graphics using a random number generator (RNG), wherein the random number generator generates a series of random numbers, and wherein the series of random numbers are converted to the sequence of graphics by replacing respective digits in the series of random numbers with respective graphics according to the registration information.

7. The method according to claim 1, wherein the plurality of fingerprints comprises a first fingerprint from a first user and a second fingerprint from a second user, wherein recording the sequence of fingerprints further comprises:
recording the first fingerprint on a first fingerprint sensor communicatively coupled to the authentication system; and
recording the second fingerprint on a second fingerprint sensor communicatively coupled to the authentication system.

8. The method according to claim 1, wherein the at least one fingerprint sensor comprises an ultrasonic fingerprint sensor.

9. The method according to claim 1, wherein the at least one fingerprint sensor comprises a capacitance fingerprint sensor.

10. An authentication system comprising:
a processor; and
a computer-readable storage medium storing program instructions for fingerprint-based authentication which, when executed by the processor, are configured to cause the processor to perform a method comprising:
storing registration information associated with a user in the authentication system communicatively coupled to at least one fingerprint sensor and an electronic device, wherein the registration information comprises a plurality of fingerprints of the user and a set of graphics, wherein each graphic of the set of graphics is associated with a respective fingerprint of the plurality of fingerprints and a respective duration of a plurality of durations;
presenting, on a user interface communicatively coupled to the authentication system and the electronic device, a Fingerprint-based Personal Identification Pattern (FPIP) comprising a sequence of graphics selected from the set of graphics;
recording, by the authentication system and in response to presenting the FPIP, a sequence of fingerprints based on input to the at least one fingerprint sensor, wherein respective fingerprints in the sequence of fingerprints are associated with respective durations of the plurality of durations that the respective fingerprint contacted the at least one fingerprint sensor; and
executing a function associated with the electronic device in response to matching, based on the registration information, the sequence of fingerprints to the sequence of graphics and matching the respective durations of the sequence of fingerprints to corresponding durations of the plurality of durations associated with graphics in the sequence of graphics.

11. The system according to claim 10, wherein the registration information further comprises each fingerprint of the plurality of fingerprints respectively associated with at least one digit of a set of numeric digits, wherein the registration information further comprises each graphic of the set of graphics respectively associated with at least one digit of the set of numeric digits.

12. The system according to claim 11, wherein the method further comprises:
matching the sequence of fingerprints to the FPIP in response to recording the sequence of fingerprints, wherein matching the sequence of fingerprints comprises:
converting the sequence of graphics to a first number by replacing each graphic with an associated digit according to the registration information;

converting the sequence of fingerprints to a second number by replacing each fingerprint with an associated digit according to the registration information; and comparing the first number to the second number, wherein a match comprises the first number being identical to the second number.

13. The system according to claim 10, wherein the program instructions were downloaded over a network from a remote data processing system.

14. The system according to claim 10, wherein the program instructions are stored in a computer-readable storage medium in a server data processing system, and wherein the instructions are downloaded over a network to the authentication system to provide fingerprint-based authentication functionality to the authentication system.

15. The system according to claim 14, wherein the program instructions are configured to cause the processor to perform a method further comprising:
  metering use of the fingerprint-based authentication functionality in the authentication system; and
  generating an invoice in response to metering use of the fingerprint-based authentication functionality.

16. A computer program product comprising a computer readable storage medium, wherein the computer readable storage medium does not comprise a transitory signal per se, wherein the computer readable storage medium stores instructions executable by a processor to cause the processor to perform a method comprising:
  storing registration information associated with a user in an authentication system communicatively coupled to at least one fingerprint sensor and an electronic device, wherein the registration information comprises a plurality of fingerprints of the user and a set of graphics, wherein each graphic of the set of graphics is associated with a respective fingerprint of the plurality of fingerprints and a respective duration of a plurality of durations;
  presenting, on a user interface communicatively coupled to the authentication system and the electronic device, a Fingerprint-based Personal Identification Pattern (FPIP) comprising a sequence of graphics selected from the set of graphics;
  recording, by the authentication system and in response to presenting the FPIP, a sequence of fingerprints based on input to the at least one fingerprint sensor, wherein respective fingerprints in the sequence of fingerprints are associated with respective durations of the plurality of durations that the respective fingerprint contacted the at least one fingerprint sensor; and
  executing a function associated with the electronic device in response to matching, based on the registration information, the sequence of fingerprints to the sequence of graphics and matching the respective durations of the sequence of fingerprints to corresponding durations of the plurality of durations associated with graphics in the sequence of graphics.

17. The computer program product according to claim 16, wherein the registration information further comprises each fingerprint of the plurality of fingerprints respectively associated with at least one digit of a set of numeric digits, wherein the registration information further comprises each graphic of the set of graphics respectively associated with at least one digit of the set of numeric digits.

18. The computer program product according to claim 17, wherein the method further comprises:
  matching the sequence of fingerprints to the FPIP in response to recording the sequence of fingerprints, wherein matching the sequence of fingerprints comprises:
    converting the sequence of graphics to a first number by replacing each graphic with an associated digit according to the registration information;
    converting the sequence of fingerprints to a second number by replacing each fingerprint with an associated digit according to the registration information; and
    comparing the first number to the second number, wherein a match comprises the first number being identical to the second number.

19. The computer program product according to claim 17, wherein the set of graphics in the registration information further comprises a first subset of graphics associated with respective digits and a second subset of graphics associated with respective ranges of time, wherein a first graphic in the sequence of graphics is from the first subset of graphics, wherein a second graphic in the sequence of graphics is from the second subset of graphics;
wherein the method further comprises:
  matching the sequence of fingerprints to the sequence of graphics in response to recording the sequence of fingerprints, wherein matching the sequence of fingerprints comprises:
    converting the sequence of graphics to a first number by:
      replacing each graphic from the first subset of graphics in the sequence of graphics with an associated digit according to the registration information;
      replacing each graphic from the second subset of graphics in the sequence of graphics with an associated range of time according to the registration information;
      associating respective ranges of time with respective digits;
    converting the sequence of fingerprints to a second number by:
      replacing each fingerprint in the sequence of fingerprints with an associated digit according to the registration information;
      associating respective durations to respective digits corresponding to respective fingerprints;
    comparing the first number to the second number, wherein a match comprises the first number being identical to the second number and each respective duration being within each respective range of time for corresponding digits in the first number and the second number.

20. The computer program product according to claim 17, wherein the registration information further comprises respective colors associated with respective ranges of time, wherein the sequence of graphics includes a respective color associated with each graphic of the sequence of graphics;
wherein the method further comprises:
  matching the sequence of fingerprints to the sequence of graphics in response to recording the sequence of fingerprints, wherein matching the sequence of fingerprints comprises:
    converting the sequence of graphics to a first number by:
      replacing each graphic in the sequence of graphics with an associated digit according to the registration information;

associating a respective range of time to each respective graphic according to a respective color of the respective graphic and according to the registration information;
converting the sequence of fingerprints to a second number by:
replacing each fingerprint with an associated digit according to the registration information;
associating respective durations to respective digits associated with respective fingerprints;
comparing the first number with associated ranges of time to the second number with associated durations, wherein a match comprises the first number identical to the second number and respective durations within respective ranges of time for corresponding digits in the first number and the second number.

* * * * *